US012563388B2

(12) United States Patent
Orr et al.

(10) Patent No.: US 12,563,388 B2
(45) Date of Patent: Feb. 24, 2026

(54) SYSTEMS AND METHODS FOR SECURITY ASSOCIATION ENABLING MAKE-BEFORE-BREAK-ROAMING (MBBR)

(71) Applicant: Cisco Technology, Inc., San Jose, CA (US)

(72) Inventors: Stephen M Orr, Wallkill, NY (US); Malcolm Muir Smith, Richardson, TX (US); Indermeet Singh Gandhi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 180 days.

(21) Appl. No.: 18/356,987

(22) Filed: Jul. 21, 2023

(65) Prior Publication Data

US 2024/0381076 A1      Nov. 14, 2024

Related U.S. Application Data

(60) Provisional application No. 63/502,109, filed on May 14, 2023.

(51) Int. Cl.
H04L 29/06 (2006.01)
G06F 21/20 (2006.01)
(Continued)

(52) U.S. Cl.
CPC ....... H04W 12/041 (2021.01); H04W 12/037 (2021.01); H04W 76/15 (2018.02); H04W 84/12 (2013.01)

(58) Field of Classification Search
CPC .. H04W 12/041; H04W 76/15; H04W 12/037
(Continued)

(56) References Cited

U.S. PATENT DOCUMENTS

2017/0019785 A1      1/2017  Liu et al.
2020/0037152 A1      1/2020  Seok et al.
(Continued)

FOREIGN PATENT DOCUMENTS

CN        107690138 A  *  2/2018  ............ H04W 12/02
CN        115396874 A      11/2022
(Continued)

OTHER PUBLICATIONS

IEEE: "4. General Description, 4.3 Components of the IEEE Std 802.11 Architecture", IEEE Draft, TGBA_CL_04, IEEE-SA, Piscataway, NJ USA, vol. 802.11ba Drafts, No. D8.0, Dec. 7, 2020, 6 Pages, XP068183804, Retrieved from http://www.ieee802.org/11/private/Draft_Standards/11ba/Draft%20P802.11ba%20D8.0%20rtf%20and%20visio.zip on Dec. 7, 2020, Draft P802.11ba D8.0 rtf and visio/TGba_C1_04.rtf, Section 4.10.3.
(Continued)

*Primary Examiner* — Haresh N Patel
(74) *Attorney, Agent, or Firm* — Polsinelli P.C.

(57) ABSTRACT

A system and method are provided for generating a pairwise transient key security association (PTKSA) by: providing a first media access control (MAC) address that is shared by multiple access points (APs), the first MAC address corresponding to an infrastructure comprising the multiple APs, and each AP of the multiple APs having a respective AP MAC address; providing a second MAC address to a station (STA); and establishing a secure link between the STA and the infrastructure using the first MAC address and the second MAC address to derive a pairwise transit key (PTK) for the secure link, wherein the secure link is between the STA and the multiple APs.

20 Claims, 8 Drawing Sheets

(51) Int. Cl.
| | |
|---|---|
| *H04W 12/037* | (2021.01) |
| *H04W 12/041* | (2021.01) |
| *H04W 76/15* | (2018.01) |
| *H04W 84/12* | (2009.01) |

(58) Field of Classification Search
USPC ............................................................. 726/6
See application file for complete search history.

(56) References Cited

U.S. PATENT DOCUMENTS

| | | | |
|---|---|---|---|
| 2020/0195438 A1 * | 6/2020 | Liu ......................... H04L 69/24 |
| 2020/0267541 A1 | 8/2020 | Huang et al. |
| 2021/0084493 A1 | 3/2021 | Naribole et al. |
| 2022/0022033 A1 | 1/2022 | Ho et al. |
| 2022/0086627 A1 | 3/2022 | Montemurro et al. |
| 2022/0272528 A1 | 8/2022 | Palanigounder et al. |
| 2022/0393988 A1 * | 12/2022 | Erta ......................... H04L 47/50 |
| 2023/0147311 A1 * | 5/2023 | Fang ................. H04W 36/0038 370/331 |

FOREIGN PATENT DOCUMENTS

| | | | | |
|---|---|---|---|---|
| DE | 102021134385 A1 * | 9/2022 | ............. H04W 12/02 |
| EP | 2062189 B1 * | 8/2016 | ........... H04L 9/0822 |
| EP | 3876571 A1 * | 9/2021 | ......... H04B 10/1129 |
| ID | P202206399 A * | 10/2022 | |
| KR | 100758354 B1 * | 9/2007 | |
| WO | WO-2022016528 A1 * | 1/2022 | ........ H04W 12/0471 |

OTHER PUBLICATIONS

International Search Report and Written Opinion for International Application No. PCT/US2024/027924, mailed Jul. 25, 2024, 13 Pages.

* cited by examiner

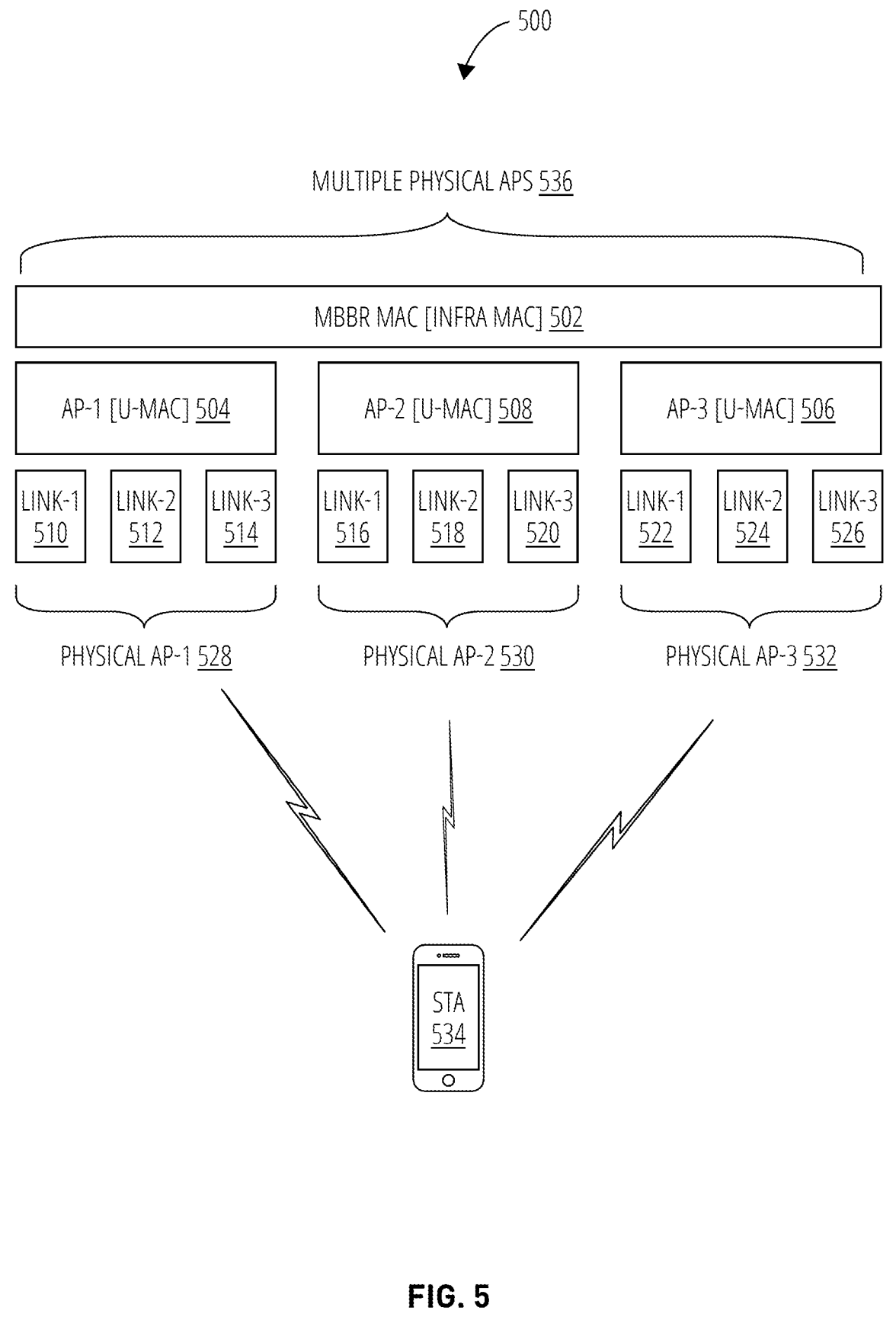

500

MULTIPLE PHYSICAL APS 536

MBBR MAC [INFRA MAC] 502

| AP-1 [U-MAC] 504 | AP-2 [U-MAC] 508 | AP-3 [U-MAC] 506 |

| LINK-1 510 | LINK-2 512 | LINK-3 514 | LINK-1 516 | LINK-2 518 | LINK-3 520 | LINK-1 522 | LINK-2 524 | LINK-3 526 |

PHYSICAL AP-1 528    PHYSICAL AP-2 530    PHYSICAL AP-3 532

STA 534

FIG. 5

| APS ANNOUNCE THE SUPPORT OF MBBR MAC ADDRESS <u>602</u> |

| STA SENDS ASSOCIATION REQUEST <u>604</u> |

| AP SENDS ASSOCIATION RESPONSE TO STA <u>606</u> |

| ESTABLISH MULTI-LINK ASSOCIATION <u>608</u> |

| PERFORM 4-WAY HANDSHAKE BETWEEN STA AND MULTIPLE PHYSICAL APS <u>610</u> |

| ENCRYPT (DECRYPT) UNICAST MPDUS <u>612</u> |

SYSTEMS AND METHODS FOR SECURITY ASSOCIATION ENABLING MAKE-BEFORE-BREAK-ROAMING (MBBR)

CROSS-REFERENCE TO RELATED APPLICATIONS

This application claims the benefit of priority to U.S. provisional application No. 63/502,109, filed on Apr. 14, 2023, which is expressly incorporated by reference herein in its entirety.

BACKGROUND

Wi-Fi 7 provides various new capabilities including that of a multi-link device (MLD) that enables a station (STA), which is also called a non-AP MLD, to establish multiple links with the same access point (AP), which is also called an AP MLD. The multi-link security used in Wi-Fi 7 fails under current proposals for Wi-Fi 8 in which it is proposed to establish STA sessions/links across multiple physical APs. As described below for Wi-Fi 7, the pairwise transit key (PTK) for the links are derived from MAC addresses for the respective MLDs, i.e., one per AP and one per STA. For Wi-Fi 8, however, it is proposed to establish sessions/links across multiple physical APs, but the security protocol used for Wi-Fi 7 fails for links that a spread over two or more physical APs because different physical APs have different MLD MAC addresses.

In Wi-Fi 7, multi-link security is provided by first establishing a multi-link association between a STA (i.e., non-AP MLD) and an AP (i.e., AP MLD). After a successful multi-link association is established between the STA and the AP, a pairwise master key (PMK) is established, and the PMK is then used to derive a pairwise transit key (PTK) by performing a 4-way handshake encryption protocol between the non-AP MLD and the AP (i.e., AP MLD). The PMK. PTK and the same packet number (PN) space are used for all the setup links between the STA (i.e., non-AP MLD) and the AP (i.e., AP MLD) for the pairwise transient key security association (PTKSA). The STA and the AP use their respective MLD MAC addresses to derive the PMK under the SAE method and PTK. For example, the PTK can be derived from the sum PMK+ANONCE+SNONCE+MAC(AA)+MAC (SA)), where ANONCE and SNONCE are random numbers provided respectively at the AP MLD and non-AP MLD, MAC(AA) is the MAC address of the AP (i.e., the MAC address of the authenticator), MAC(SA) is the MAC address of the STA (i.e., supplicant). Thus, the security keys (PTK) for the links are derived from MLD-MAC (one per AP and one per STA).

In Wi-Fi 8, it is proposed to establish STA sessions/links across multiple physical APs, which is incompatible with the security association established under WI-Fi 7 in which the security keys (PTK) for the links are derived from MLD-MAC because different physical APs have different MLD MAC addresses. This problem also arises in other contexts. For example, there have been proposals for performing make-before-break-roaming (MBBR) across multiple APs. These proposals also have a security-association issue due to the keys across different physical APs being different because the MLD MAC address is different for each physical AP.

Accordingly an improved security protocol is desired to mitigate the above-identified issue. For example, it is desired to develop a new method of key generation that maintains each security association for the respective links when a link can include multiple physical APs. This improved method of key generation will benefit, among other things, the association timeframe while performing make-before-break-roaming (MBBR) across physical APs.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 illustrates an schematic diagram of an example of an make-before-break-roaming (MBBR) system, in accordance with certain embodiments.

DESCRIPTION OF EXAMPLE EMBODIMENTS

Figure 1:
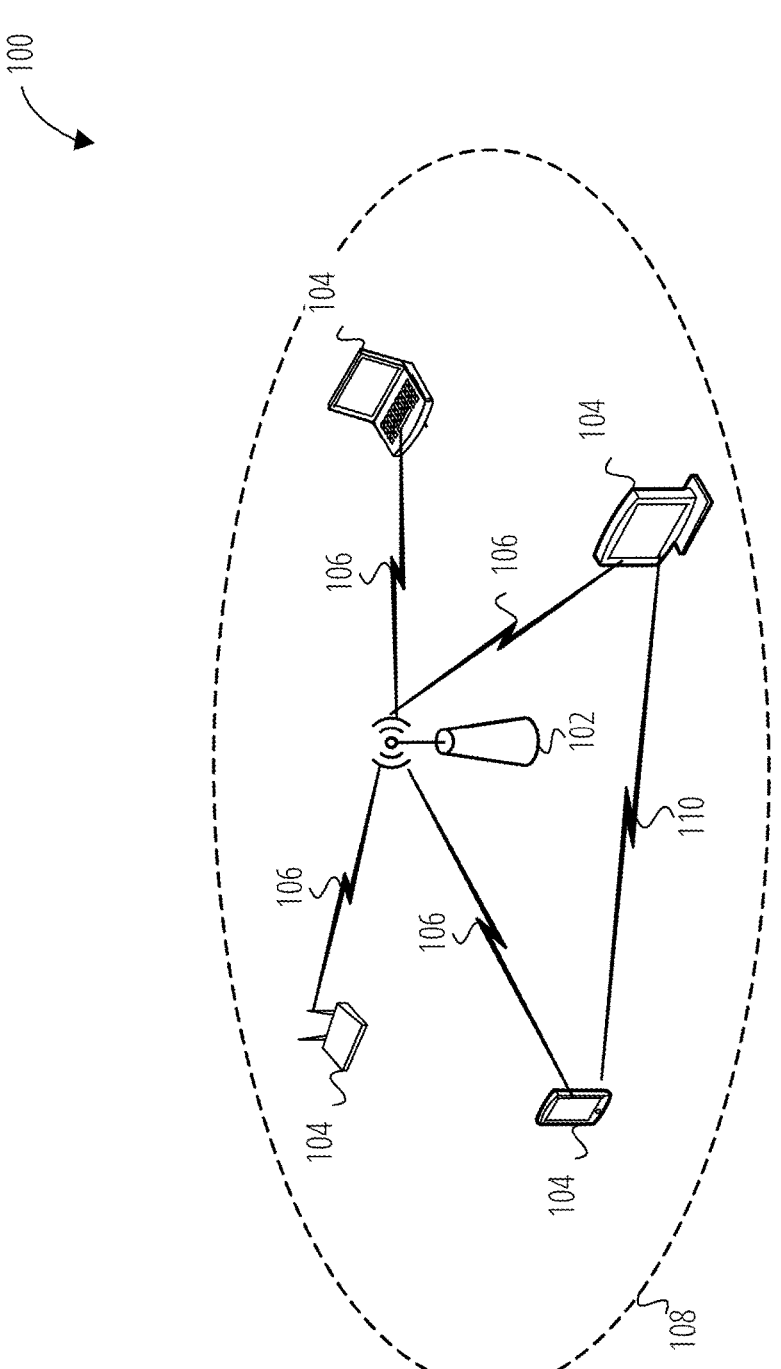
FIG. 1 illustrates an schematic diagram of an example of a wireless communication network, in accordance with certain embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

In one aspect, a method is provided for generating a pairwise transient key security association (PTKSA). The method includes providing a first media access control (MAC) address that is shared by multiple access points (APs), the first MAC address corresponding to an infrastructure comprising the multiple APs, and each AP of the multiple APs having a respective AP MAC address. The method further includes providing a second MAC address to a station (STA); and establishing a secure link between the STA and the infrastructure using the first MAC address and the second MAC address to derive a pairwise transit key (PTK) for the secure link, wherein the secure link is between the STA and the multiple APs.

In another aspect, the method may also include that the infrastructure is a make-before-break-roaming (MBBR) infrastructure.

In another aspect, the method may also include that establishing the secure link between the STA and the infrastructure includes: deriving a pairwise master key (PMK) using a simultaneous authentication of equals (SAE) method to establish a multi-link association between the STA and the infrastructure; and using a 4-way handshake protocol between the STA and the infrastructure to derive the PTK based on the PMK, the first MAC address, and the second MAC address.

In another aspect, the method may also include setting up respective links between the STA and each AP of the multiple APs using the PMK, the PTK, and a same packet number (PN) space.

In another aspect, the method may also include providing roaming among respective APs of the infrastructure while maintaining secure communication between the STA and the infrastructure without the STA deriving a new PTK for the secure communication.

In another aspect, the method may also include using the PTK for secure communications simultaneously between two or more APs of the multiple APs.

In another aspect, the method may also include using the PTK to encrypt media access control protocol data units (MPDUs) transmitted from the STA to two or more APs of the multiple APs; or using the PTK to decrypt MPDUs received at the STA from two or more APs of the multiple APs.

In one aspect, a computing apparatus includes a processor. The computing apparatus also includes a memory storing instructions that, when executed by the processor, configure the apparatus to provide a first media access control (MAC) address that is shared by multiple access points (APs), the first MAC address corresponding to an infrastructure comprising the multiple APs, and each AP of the multiple APs having a respective AP MAC address; provide a second MAC address to a station (STA); and establish a secure link between the STA and the infrastructure using the first MAC address and the second MAC address to derive a pairwise transit key (PTK) for the secure link, wherein the secure link is between the STA and the multiple APs.

In another aspect, the computing apparatus may also include that the infrastructure is a make-before-break-roaming (MBBR) infrastructure.

In another aspect, the computing apparatus may also include that establishing the secure link between the STA and the infrastructure includes: deriving a pairwise master key (PMK) using a simultaneous authentication of equals (SAE) method to establish a multi-link association between the STA and the infrastructure; and using a 4-way handshake protocol between the STA and the infrastructure to derive the PTK based on the PMK, the first MAC address, and the second MAC address.

In another aspect, the computing apparatus may also include that when executed by the processor, the instructions stored in the memory cause the processor to set up respective links between the STA and each AP of the multiple APs using the PMK, the PTK, and a same packet number (PN) space.

In another aspect, the computing apparatus may also include that when executed by the processor, the instructions stored in the memory cause the processor to provide roaming among respective APs of the infrastructure while maintaining secure communication between the STA and the infrastructure without the STA deriving a new PTK for the secure communication.

In another aspect, the computing apparatus may also include that when executed by the processor, the instructions stored in the memory cause the processor to use the PTK for secure communications simultaneously between two or more APs of the multiple APs.

In another aspect, the computing apparatus may also include that when executed by the processor, the instructions stored in the memory cause the processor to use the PTK to encrypt media access control protocol data units (MPDUs) transmitted from the STA to two or more APs of the multiple APs; or use the PTK to decrypt MPDUs received at the STA from two or more APs of the multiple APs.

In one aspect, a non-transitory computer-readable storage medium, the computer-readable storage medium including instructions that when executed by a computer, cause the computer to: provide a first media access control (MAC) address that is shared by multiple access points (APs), the first MAC address corresponding to an infrastructure comprising the multiple APs, and each AP of the multiple APs having a respective AP MAC address; provide a second MAC address to a station (STA); and establish a secure link between the STA and the infrastructure using the first MAC address and the second MAC address to derive a pairwise transit key (PTK) for the secure link, wherein the secure link is between the STA and the multiple APs.

In another aspect, the computer-readable storage medium may include instructions such that the infrastructure is a make-before-break-roaming (MBBR) infrastructure.

In another aspect, the computer-readable storage medium may include instructions such that establishing the secure link between the STA and the infrastructure includes: deriving a pairwise master key (PMK) using a simultaneous authentication of equals (SAE) method to establish a multi-link association between the STA and the infrastructure; and using a 4-way handshake protocol between the STA and the infrastructure to derive the PTK based on the PMK, the first MAC address, and the second MAC address.

In another aspect, the computer-readable storage medium may include instructions that when executed by a computer, cause the computer to: set up respective links between the STA and each AP of the multiple APs using the PMK, the PTK, and a same packet number (PN) space.

In another aspect, the computer-readable storage medium may include instructions that when executed by a computer, cause the computer to: provide roaming among respective APs of the infrastructure while maintaining secure communication between the STA and the infrastructure without the STA deriving a new PTK for the secure communication.

In another aspect, the computer-readable storage medium may include instructions that when executed by a computer, cause the computer to: use the PTK for secure communications simultaneously between two or more APs of the multiple APs.

In another aspect, the computer-readable storage medium may include instructions that when executed by a computer, cause the computer to: use the PTK to encrypt media access control protocol data units (MPDUs) transmitted from the STA to two or more APs of the multiple APs; or use the PTK to decrypt MPDUs received at the STA from two or more APs of the multiple APs.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for an improved security protocol that mitigates the security issues for multi-link security associations. For example, it is desired to develop a new method of key generation that maintains each security association for the respective links when a link can include multiple physical APs. This improved method of key generation will benefit, among other things, the association timeframe while performing make-before-break-roaming (MBBR) across physical APs.

The improved security protocol enables MBBR by using a common MAC address (e.g., the MBBR MAC address) that is used by multiple access points to generate the temporal key (TK) used for encryption. The TK can be the pairwise transient key (PTK). The APs within the MBBR infrastructure will have compatible keys. Thus, a STA can move among cells of different APs within the MBBR infrastructure without needing to be reauthenticated and reestablish a security association.

Aspects of the present disclosure can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

IEEE 802.11, commonly referred to as Wi-Fi, has been around for three decades and has become arguably one of the most popular wireless communication standards, with billions of devices supporting more than half of the worldwide wireless traffic. Wi-Fi generally has a new amendment after every 5 years with its own characteristic features. Various security related changes were proposed as part of IEEE 802.11i. IEEE 802.11i enhances IEEE 802.11-1999 by providing a Robust Security Network (RSN) with two new protocols (i.e., the four-way handshake and the group key handshake), which use the authentication services and port access control described in IEEE 802.1X to establish and change respective cryptographic keys. The RSN is a security network that only allows the creation of robust security network associations (RSNAs), which are a type of association used by a pair of stations (STAs) if the procedure to establish authentication or association between them includes the 4-Way Handshake.

IEEE 802.11i provides various security enhancements. Further, IEEE 802.11i references the Extensible Authentication Protocol (EAP) standard, which is a means for providing mutual authentication between STAs and the WLAN infrastructure, as well as performing automatic cryptographic key distribution. IEEE 802.11i generates cryptographic checksums through hash message authentication codes (HMAC). The IEEE 802.11i specification introduces the concept of a Robust Security Network (RSN), which is defined as a wireless security network that only allows the creation of Robust Security Network Associations (RSNA). An RSNA is a logical connection between communicating IEEE 802.11 entities established through the IEEE 802.11i key management scheme, called the 4-Way handshake, which is a protocol that validates that both entities share a pairwise master key (PMK), synchronizes the installation of temporal keys, and confirms the selection and configuration of data confidentiality and integrity protocols. The PMK serves as the basis for the IEEE 802.11i data confidentiality and integrity protocols that provide enhanced security relative to previous techniques (e.g., Wired Equivalent Privacy (WEP)).

The IEEE 802.1X standard defines several terms related to authentication: authenticator, supplicant, and authentication server. The authenticator is an entity such as an AP that facilitates an authentication attempt. The supplicant is an entity such as a STA that is authenticated by an authenticator. The authentication server (AS) is an entity that provides an authentication service to an authenticator. This service determines, from the credentials provided by the supplicant, whether the supplicant is authorized to access the services provided by the authenticator. The AS either authenticates the STA and AP itself, or it provides information to the STA and AP so that they may authenticate each other.

Recently, the increasing user demands in terms of throughput, capacity, latency, spectrum, and power efficiency have motivated updates or amendments to the IEEE 802.11 standard. In the earlier generations, amendments to the IEEE 802.11 focused primarily on improving the data rates. As the density of devices has with increased, however, area efficiency has become a major concern for Wi-Fi networks. Due to this issue, the last (802.11 be (Wi-Fi 7)) amendments focused more on efficiency. The next expected update to IEEE 802.11 is coined as Wi-Fi 8. Wi-Fi 8 will attempt to further enhance throughput and minimize latency to meet the growing demand for the Internet of Things (IoT), high-resolution video streaming, low-latency wireless services, etc.

Wi-Fi 7 introduced the concept of multi-link operation (MLO), which gives the devices (Access Points (APs) and Stations (STAs)) the capability to operate on multiple links (or even bands) at the same time. MLO introduces a new paradigm to multi-AP coordination which was not part of the earlier coordination approaches. MLO is considered in Wi-Fi-7 to improve the throughput of the network and address the latency issues by allowing devices to use multiple links.

A multi-link device (MLD) may have several "affiliated" devices, each affiliated device having a separate PHY interface, and the MLD having a single link to the Logical Link Control (LLC) layer. A multi-link device (MLD) can be defined as a device that is a logical entity and has more than one affiliated station (STA) and has a single medium access control (MAC) service access point (SAP) to logical link control (LLC), which includes one MAC data service. In multi-link operation (MLO) both STA and APs can possess multiple links that can be simultaneously active. These links may or may not use the same bands/channels. MLO allows sending PHY protocol data units (PPDUs) on more than one link between an STA and an AP. The links may be carried on different channels, which may be in different frequency bands. Based on the frequency band and/or channel separation and filter performance, there may be restrictions on the way the PPDUs are sent on each of the links. MLO may include a basic transmission mode, an asynchronous transmission mode, and a synchronous transmission mode.

In multi-link operation (MLO) both STA and APs can possess multiple links that can be simultaneously active. These links may or may not use the same bands/channels.

MLO allows sending PHY protocol data units (PPDUs) on more than one link between an STA and an AP. The links may be carried on different channels, which may be in different frequency bands. Based on the frequency band and/or channel separation and filter performance, there may be restrictions on the way the PPDUs are sent on each of the links.

MLO may include a basic transmission mode, an asynchronous transmission mode, and a synchronous transmission mode.

In a basic transmission mode, there may be multiple primary links, but a device may transmit PPDU on one link at a time. The link for transmission may be selected as follows. The device (such as an AP or a STA) may count down a random back off (RBO) on both links and select a link that wins the medium for transmission. The other link may be blocked by in-device interference. In basic transmission mode, aggregation gains may not be achieved.

In an asynchronous transmission mode, a device may count down the RBO on both links and perform PPDU transmission independently on each link. The asynchronous transmission mode may be used when the device can support simultaneous transmission and reception with bands that have sufficient frequency separation such as separation between the 2.4 GHz band and the 5 GHz band. The asynchronous transmission mode may provide both latency and aggregation gains.

In a synchronous PPDU transmission mode, the device may count down the RBO on both links. If a first link wins the medium, both links may transmit PPDUs at the same time. The transmission at the same time may minimize in-device interference and may provide both latency and aggregation gains.

Multi-AP coordination and MLO are two features proposed to improve the performance of Wi-Fi networks in the upcoming IEEE 802.11 be amendment. Multiple Access Point (AP) coordination and transmission in Wi-Fi refers to the management of multiple access points in a wireless network to avoid interference and ensure efficient communication between the client devices and the network. When multiple access points are deployed in a network, they operate on the same radio frequency, which can cause interference and degrade the network performance. To mitigate this issue, access points can be configured to coordinate their transmissions and avoid overlapping channels. Multi-AP coordination is directed toward utilizing (distributed) coordination between different APs to reduce inter-Basic Service Set (BSS) interference for improved spectrum utilization in dense deployments. MLO, on the other hand, supports high data rates and low latency by leveraging flexible resource utilization offered by the use of multiple links for the same device.

FIG. 1 shows a block diagram of an example wireless communication network according to some aspects of the present disclosure. Wireless communication network 100 can be an example of a wireless local area network (WLAN) such as a Wi-Fi network (and will hereinafter be referred to as WLAN 100). For example, WLAN 100 can be a Wi-Fi network operating based on any IEEE 802.11 protocols and standards (e.g., 802.11 ay, 802.11 ax, 802.11az, 802.11ba, and 802.11be). WLAN 100 may include wireless communication devices such as an AP 102 and multiple STAs 104. The number of APs and STAs are not limited to that shown in FIG. 1 and can be more or less. Any one or more of AP 102 and STAs 104 may be capable of MLO (multi-link reception and/or transmission).

Each of STAs 104 can be any one or more of mobile phones, personal digital assistants (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), IoT devices, etc.

A single AP 102 and an associated set of STAs 104 may be referred to as a basic service set (BSS), managed by AP 102.

FIG. 1 shows an example coverage area 108 of AP 102, which may represent a basic service area (BSA) of WLAN 100. BSS may be identified to users by a service set identifier (SSID), as well as to other devices by a basic service set identifier (BSSID), which may be a medium access control (MAC) address of AP 102. AP 102 can periodically broadcast beacons including BSSID to enable any STA 104 within the wireless range of AP 102 to "associate" or re-associate with AP 102 to establish a communication link 106 with AP 102. For example, the beacons can include an identification of a primary channel used by respective AP 102 as well as a timing synchronization function for establishing or maintaining timing synchronization with AP 102.

To establish a communication link 106 with an AP 102, each of STAs 104 is configured to perform passive or active scans on frequency channels in one or more frequency bands (for example, the 2.4 GHZ, 5 GHZ, 6 GHz or 60 GHz bands). Passive scans entail an STA 104 listening for beacons transmitted by AP 102 at a periodic time interval referred to as the target beacon transmission time (TBTT) (measured in time units (TUs) where one TU may be equal to 1024 microseconds (μs)).

Active scans entail an STA 104 generating and sequentially transmitting probe requests on each channel to be scanned and listening for probe responses from APs 102. Each STA 104 may be configured to identify or select an AP 102 with which to associate based on the scanning information obtained through the passive or active scans, and performing authentication and association operations to establish a communication link 106 with a selected AP 102. AP 102 assigns an association identifier to STA 104 at the conclusion of the association operations, which AP 102 can then utilize to track STA 104.

Figure 2:
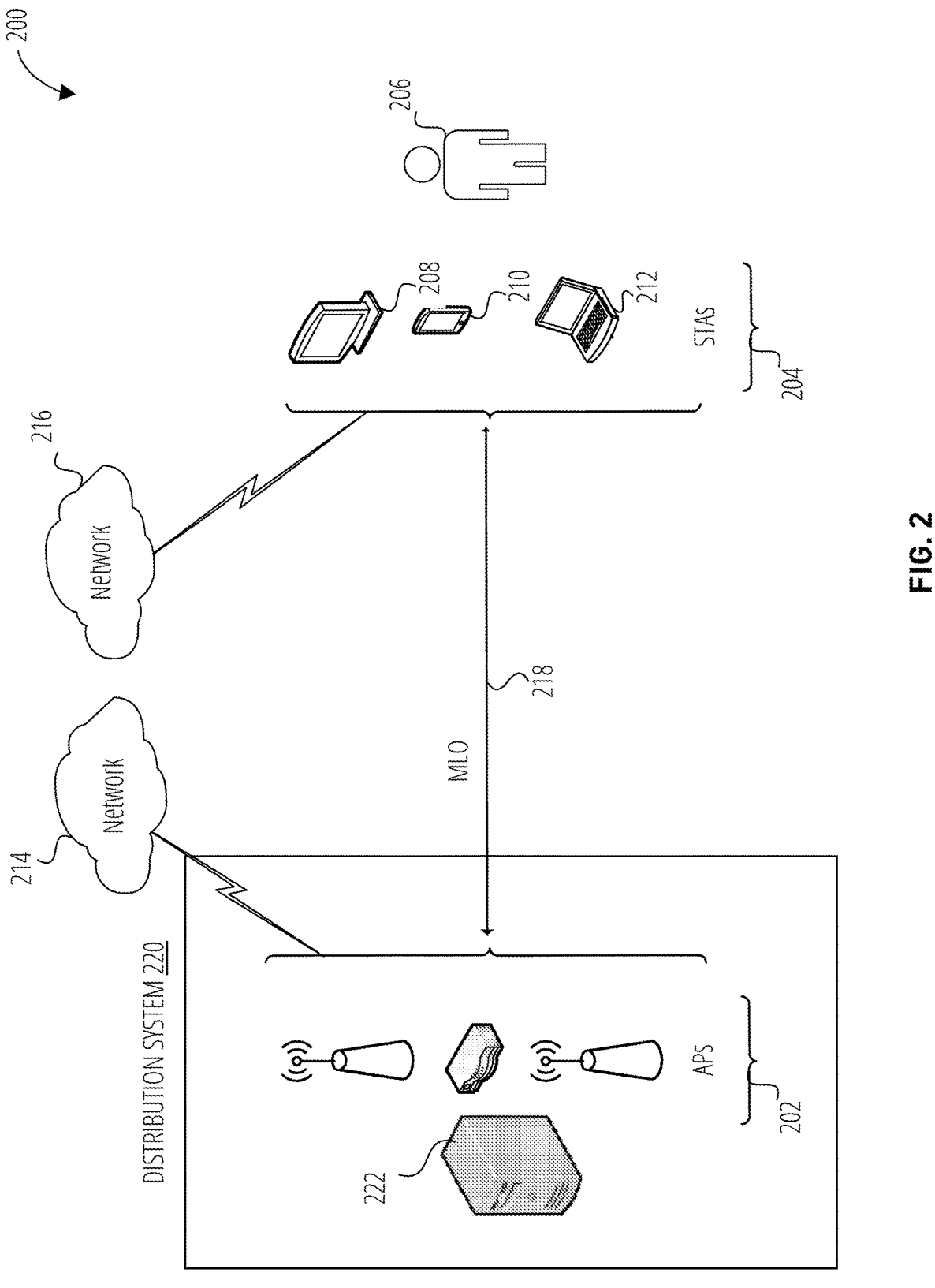
FIG. 2 illustrates an schematic diagram of an example of multi-link operation in the wireless network, in accordance with certain embodiments.

FIG. 2 is a network diagram illustrating an example network environment of multi-link operation, according to some aspects of the present disclosure. Wireless network 200 may include one or more STAs 204 (includes example devices 208, 210, and 212) and one or more APs 202, which may communicate in accordance with IEEE 802.11 communication standards. STAs 204 and APs 202 may be the same as STAs 104 and AP 102 of FIG. 1, respectively.

One or more STAs 204 and/or APs 202 may be operable by one or more user(s) 206.

STAs 204 and/or APs 202 may also include mesh stations in, for example, a mesh network, in accordance with one or more IEEE 802.11 standards and/or 3GPP standards.

Any of STAs 204 and APs 202 may be configured to communicate with each other via one or more communications networks 214 and/or networks 216, which may be the same as WLAN 100. STAs 204 may also communicate peer-to-peer or directly with each other with or without APs 202. Any of the communications networks 214 and/or networks 216 may include, but are not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 214 and/or networks 214 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 214 and/or networks 216 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of STAs 204 and APs 202 may be configured to perform directional transmission and/or directional reception in conjunction with wirelessly communicating in a wireless network. Any of STAs 204 and APs 202 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of STAs 204 and APs 202 may be configured to perform any given directional transmission towards one or more defined transmit sectors. Any of STAs 204 and APs 202 may be configured to perform any given directional reception from one or more defined receive sectors.

Multiple Input-Multiple Output (MIMO) beamforming in a wireless network may be accomplished using RF beamforming and/or digital beamforming. In some embodiments, in performing a given MIMO transmission, STAs 204 and/or APs 202 may be configured to use all or a subset of its one or more communications antennas to perform MIMO beamforming.

Any of STAs 204 and APs 202 may include any suitable radio and/or transceiver for transmitting and/or receiving radio frequency (RF) signals in the bandwidth and/or channels corresponding to the communications protocols utilized by any of STAs 204 and APs 202 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad, 802.11ay). 800 MHz channels (e.g., 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In certain non-limiting examples, and with reference to FIG. 1, APs 102 may facilitate multi-link operation 218 with one or more STAs 204.

Now, security aspects of the wireless network 200 are discussed. The IEEE 802.1X standard defines several terms related to authentication. The authenticator is an entity at one end of a point-to-point LAN segment that facilitates authentication of the entity attached to the other end of that link. For example, the APs 202 in FIG. 2 can serve as authenticators. The supplicant is the entity being authenticated. The STAs 204 may be viewed as supplicants. The authentication server (AS) 222 is an entity that provides an authentication service to an authenticator. This service determines from the credentials provided by the supplicant whether the supplicant is authorized to access the services provided by the authenticator. The AS 222 provides these authentication services and delivers session keys to each of the APs 202 in the wireless network; each of the STAs 204 either receives session keys from the AS or derives the session keys itself. The AS either authenticates the STA and AP itself, or provides information to the STA and AP so that they may authenticate each other. The AS 222 typically lies inside the DS 220, as depicted in FIG. 2. When employing a solution based on the IEEE 802.11i standard, the AS 222 most often used for authentication is an Authentication, Authorization, and Accounting (AAA) server that uses the Remote Authentication Dial In User Service (RADIUS) or Diameter protocol to transport authentication-related traffic. The supplicant/authenticator model is intrinsically a unilateral rather than mutual authentication model: the supplicant authenticates to the network.

Further, according to a non-limiting example, FIG. 2 provides a conceptual view of components of a wireless network 200, including: STAs 204, APs 202, and the AS 222. In this example, the STAs 204 are the supplicants, and the APs 202 are the authenticators. Until successful authentication occurs between one of the STAs 204 and the AS authentication server 222, the STA's communications are blocked by the APs 202. Because the APs 202 sit at the boundary between the wireless and wired networks, this prevents the unauthenticated STA from reaching the wired network. According to certain non-limiting examples, the technique used to block the communications can be port-based access control.

Figure 3:
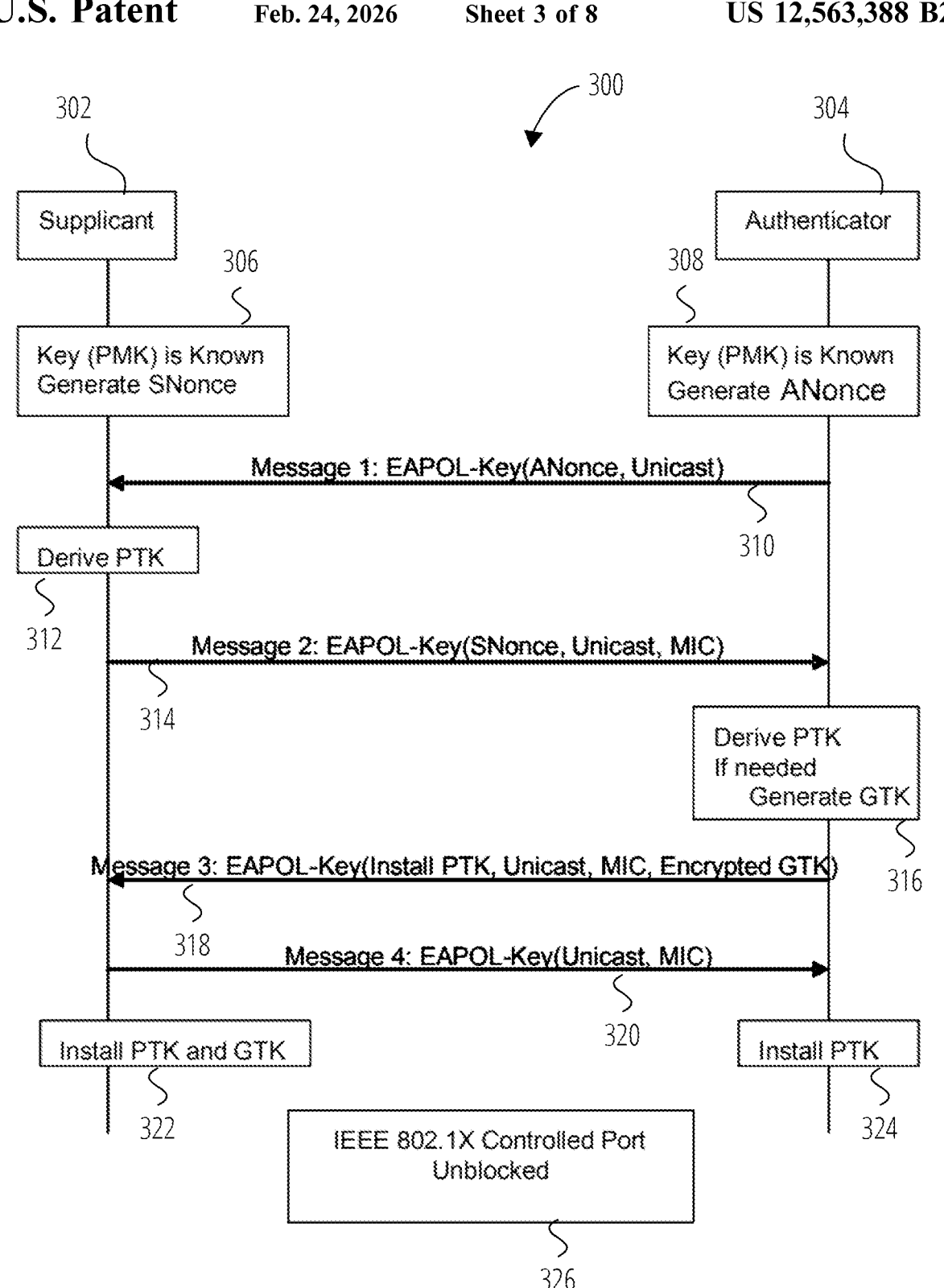
FIG. 3 illustrates a call flow of a 4-way handshake, in accordance with certain embodiments.

The 4-way handshake 300, which is illustrated in FIG. 3, is the process of exchanging four messages between an authenticator 304 and a supplicant 302 to generate encryption keys, which are then used to encrypt data sent over a wireless channel in the wireless network 200. The generated encryption keys can include a pairwise transient key (PTK)

and a group temporal key (GTK). The PTK can be used, e.g., to encrypt all unicast traffic between a given STA 204 and a given AP 202 (i.e., the PTK is unique between the given STA 204 and the given AP 202). The GTK can be used to encrypt all broadcast and multicast traffic between multiple STAs 204 and the APs 202. The GTK is the key that is shared between all STA 204 in the BSSID.

The 4-way handshake 300 can use EAPOL-Key frames and can be initiated by the Authenticator to do the following: confirm that a live peer holds the PMK; confirm that the PMK is current; derive a fresh pairwise transient key (PTK) from the PMK; install the pairwise encryption and integrity keys into IEEE 802.11; transport from the authenticator 304 to the supplicant 302 the group temporal key (GTK); transport the GTK sequence number from the authenticator 304 to the supplicant 302; install the GTK and GTK sequence number in the STAs 204 and, if not already installed, in the APs 202; and confirm the cipher suite selection.

At step 306, the supplicant 302 has a pairwise master key (PMK) and uses the PMK to generate a SNounce (supplicant nounce).

At step 308, the authenticator 304 uses the PMK to generate an ANounce (authenticator nounce).

At step 310, the authenticator 304 sends to the supplicant 302 message 1 (M1), which includes the ANounce. The 4-way handshake 300 can use EAPOL-Key frames to transmit the four messages: message 1 (M1) 310; message 2 (M2) 314; message 3 (M3) 318; and message 4 (M4) 320. EAPOL-Key frames are special key management frames used by stations to derive key information and establish secure communication. EAPOL-Key frames are also used to update expired temporal keys between associated stations. For example, the EAPOL-Key frames can be protected by a 128-bit key confirmation key (KCK) and a 128-bit key encryption key (KEK). For example, these keys are used with an AES algorithm in which the messages are encrypted with the 128-bit KEK using the AES key wrap defined in RFC 3394. The key wrap encrypts the data in 64-bit blocks, mixing in the output of the previous block to prevent repeating input from producing repeating output.

At step 312, the supplicant derives the PTK. According to certain non-limiting examples, the PTK is generated between the given STA 204 and the given AP 202, according to the following expression:

$$PTK = PRF \ (PMK + Anonce + SNonce + Mac \ (AA) + Mac \ (SA)),$$

where PRF is a pseudo-random function, ANonce is a random number generated by the authenticator 304, SNonce is a random number generated by the supplicant 302, and the MAC addresses of the supplicant 302 and the authenticator 304 are Mac (AA) and Mac (SA) respectively.

At step 314, using EAPOL-Key frames, the supplicant 302 sends to the authenticator 304 the message M2, which includes the SNounce and the message integrity code/check (MIC). That is, upon generating the PTK, the supplicant 302 sends out SNonce, which is needed by the authenticator 304 t to also generate PTK. The supplicant 302 sends M2 in an EAPOL-key frame to the authenticator 304 with the MIC to ensure the authenticator 304 can verify whether this message was corrupted or modified. Once the SNonce is received, the authenticator 304 can generate the PTK for unicast traffic encryption.

At step 316, the authenticator 304 derives the PTK and uses the PTK to generate the GTK, which is discussed below. The GTK can be generated using a simpler process than the PTK because they can be delivered and protected by the EAPOL-Key frames. The authentication server 222 maintains a randomly generated group master key (GMK), which can be used as input to the PRF along with a random number to generate the GTK.

At step 318, using EAPOL-Key frames, the authenticator 304 sends to the supplicant 302 the message M3, which includes the SNounce and the message integrity code/check (MIC). Once the authenticator 304 has generated the GTK, the authenticator 304 encrypts the GTK and sends it to the supplicant 302 on the network protected by EAPOL-Key frames. If one of the STAs 204 leaves the network, the APs 202 can generate a new GTK from the GMK and a new random number.

At step 320, using EAPOL-Key frames, the supplicant 302 sends to the authenticator 304 the message M2, which confirm that the keys have been installed.

At step 322, the supplicant 302 installs the GTK.

At step 324, the authenticator 304 installs the GTK.

At step 326, upon successful completion of the 4-way handshake 300, the authenticator 304 and supplicant 302 have authenticated each other; and the IEEE 802.1X controlled ports are unblocked to permit general data traffic.

A 4-Way Handshake utilizing EAPOL-Key frames is initiated by the Authenticator to do the following: —Confirm that a live peer holds the PMK. —Confirm that the PMK is current. —Derive a fresh pairwise transient key (PTK) from the PMK. Install the pairwise encryption and integrity keys into IEEE 802.11. —Transport the group temporal key (GTK) and GTK sequence number from Authenticator to Supplicant and install the GTK and GTK sequence number in the STA and, if not already installed, in the AP. —Confirm the cipher suite selection.

Figure 4A:
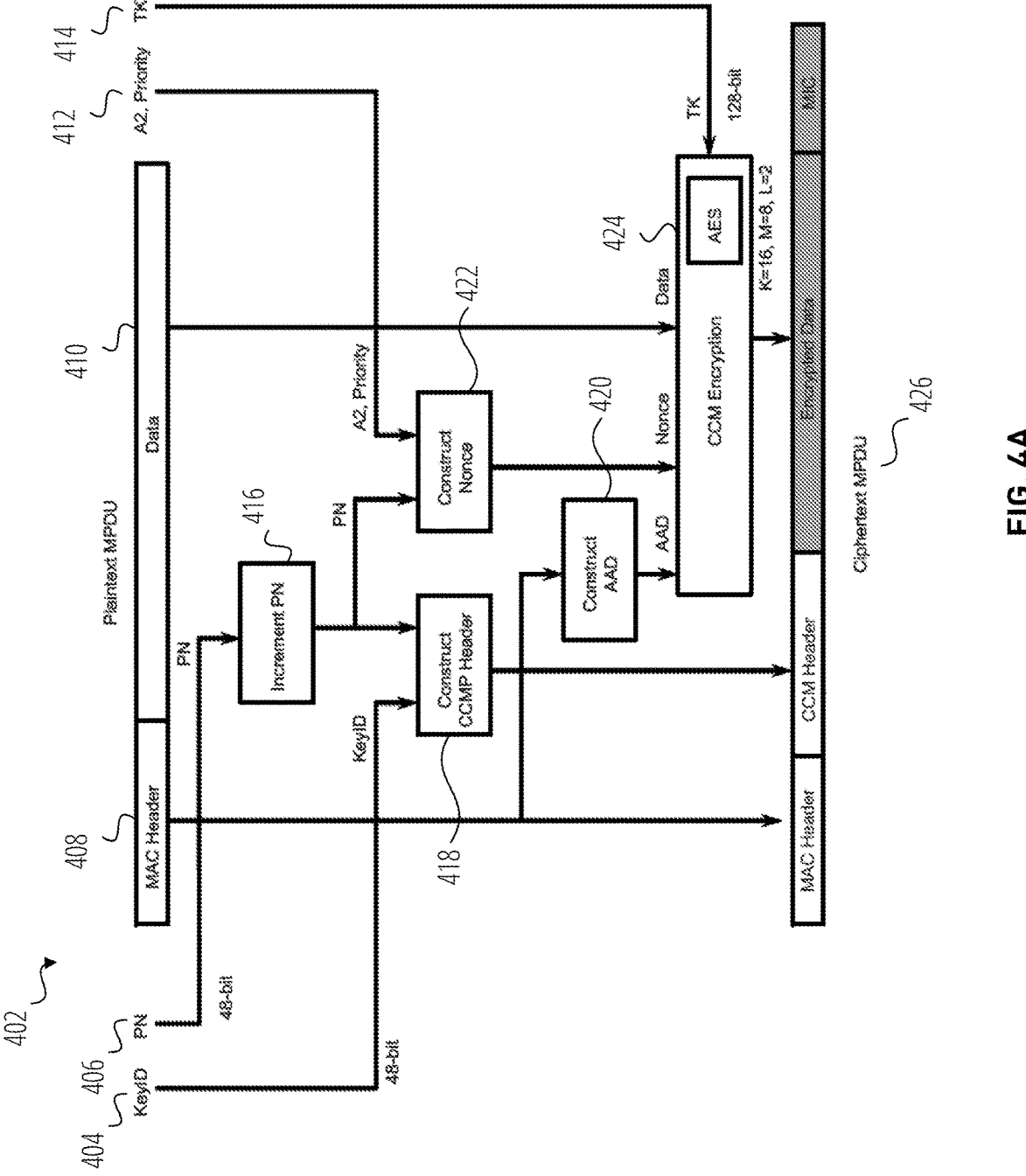
FIG. 4A illustrates a block diagram of an example of encrypting plaintext to cyphertext, in accordance with certain embodiments.

FIG. 4A illustrates a non-limiting example of using a temporal key (TK), such as the GTK or the PTK, to encrypt and transmit a message using a Counter Mode Cipher Block Chaining Message Authentication Code Protocol (CCMP). CCMP is based on CCM, a generic authenticated encryption block cipher mode of AES. 43 CCM is a mode of operation defined for any block cipher with a 128-bit block size. CCM combines two proven cryptographic techniques to achieve robust security. This example using CCMP is non-limiting and other encryption protocols can be used with the TK 414.

The encryption 402 is performed using CCMP encapsulation. CCMP encapsulation is the process of generating the cryptographic payload 426 (ciphertext) from the plaintext data. The plaintext data comprises user traffic 410 and a MAC header 408. The primary steps of CCMP encapsulation are the following:

The packet number (PN) 406 maintained for the session is incremented at block 416.

The PN 406 and other portions of the address field 412 are combined to form the nonce at block 422.

The identifier for the TK 414, or keyID 404, and the PN 406 are combined to form the CCMP header, at block 418.

The MAC header 408 is used to construct the Additional Authentication Data (AAD), at block 420. According to certain non-limiting examples, the AAD is a 22-byte or 28-byte parameter comprising several fields, including several addresses and the quality-of-service control field, that are used as additional input into the CCM authentication process.

At block 424, the AAD, nonce, and plaintext data are provided as inputs to CCM along with the TK 414 to encrypt the data 410. The packet header, the CCM header, and the ciphertext data are concatenated to form the ciphertext (or encapsulated) packet 426.

CCM is an "authenticate-and-encrypt" block cipher mode of AES. As such, it both encrypts and produces a MIC.

Figure 4B:
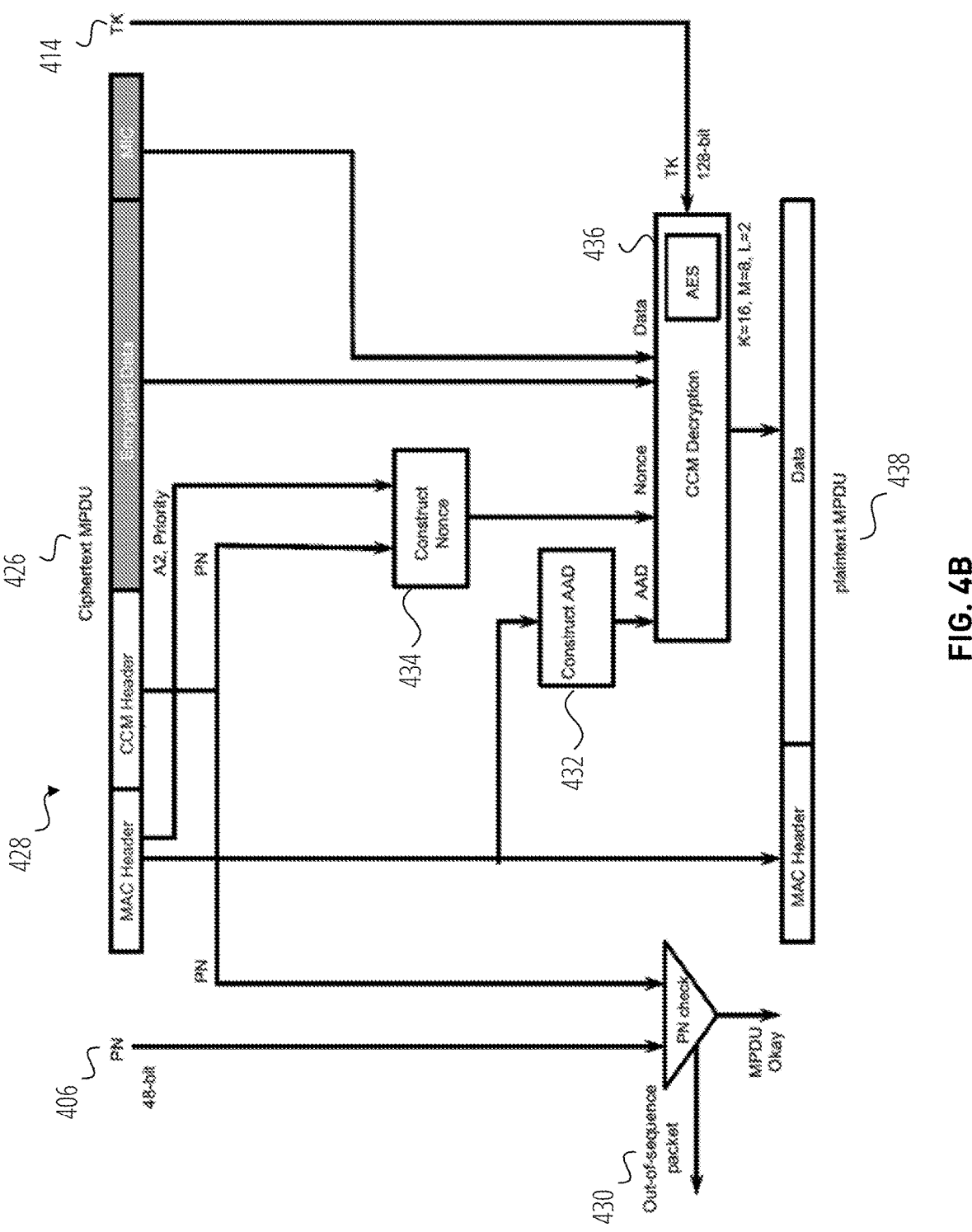
FIG. 4B illustrates a block diagram of an example of decrypting cyphertext to plaintext, in accordance with certain embodiments.

FIG. 4B illustrates a non-limiting example of using the TK (e.g., the GTK or the PTK) to decrypt a message using CCMP. This example using CCMP is non-limiting and other encryption protocols can be used with the TK 414.

The decryption 428 is performed using CCMP decapsulation. CCMP decapsulation is used to recover and decrypt a transmitted frame.

The key steps of CCMP decapsulation are as follows:

The encrypted frame 426 is parsed to re-construct the AAD and the nonce.

At block 432, the AAD is formed from the frame header.

At block 434, the nonce is formed from the PN 406 plus the address fields 412 (e.g., A2 (transmit address) and priority fields).

At block 436, the CCM uses the Temporal key, AAD, nonce, MIC, and encrypted payload to recover the plaintext data and to verify the MIC. If the MIC integrity check fails, CCM will not return the plaintext.

The received frame header and the plaintext data are concatenated to form the plaintext frame.

The PN in the frame is validated against the PN 406 maintained for the session to generate the outs out of sequence indicator 430 and the MPDU okay signal. If the PN received is not greater than the session PN, then the frame is simply discarded. This check prevents replay attacks.

Although FIG. 4B illustrates decryption 428 using CCMP, this example is non-limiting and other protocols can be used to decrypt cyphertext using the GTK. For example, Temporal Key Integrity Protocol (TKIP) can be used to decrypt cyphertext using the GTK. TKIP can be used as a solution for IEEE 802.11 WLANs to address the numerous inadequacies of WEP. TKIP may be implemented through software updates; it does not require hardware replacement of APs and STAs. Encapsulation and decapsulation using TKIP is the process of encrypting and decrypting the cryptographic payload (ciphertext) from the plaintext data. The plaintext data comprises user traffic and the source and destination MAC addresses. TKIP encapsulation builds upon the WEP encapsulation technique, modifying WEP with additional features through software, to bolster security without requiring hardware changes. TKIP uses three distinct keys: two integrity keys and an encryption key. During decapsulation, various checks are performed on the frames. For example, if the TSC indicates a violation of proper frame sequencing (it should be monotonically increasing), the frame is discarded. Also, the MIC is recomputed and compared with the MIC in the packet; if they do not match, the frame is discarded and TKIP countermeasures are invoked, which serve as a TKIP safety net.

When the PTK has been established previously, the keys can be rotated using a 2-way handshake, which omits the first two messages M1 and M2, because the existence of the PTK enables secure transmission of the new keys. For example, using the existing PTK, 2-way Group Key handshake that includes only M3 and M4 can be performed to transmit a new GTK and a new GTK from the authenticator 304 to the supplicant 302, thereby allowing rotation of the GTK and GTK using an M3 message as part of a 2-way Group Key handshake.

The system 500 includes a make-before-break-roaming (MBBR) MAC address 502 (abbreviated herein as MBBR MAC 502 and also referred to as an infra MAC). The MBBR MAC 502 spans multiple physical APs (e.g., physical AP-1 528, physical AP-2 530, and physical AP-3 532). The MBBR MAC 502 is a MAC address for the infrastructure. This new MBBR MAC address is the same across multiple physical APs. Each of the physical APs has a respective unicast MAC address (e.g., AP-1 unicast MAC 504, AP-3 unicast MAC 506, and AP-2 unicast MAC 508). Further, each of the physical APs can establish respective links. In FIG. 5, the physical AP-1 528 is illustrated as having three links (e.g., link-1 510, link-2 512, and link-3 514). The physical AP-2 530 is illustrated as having three links (e.g., link-1 516, a link-2 518, and link-3 520). The physical AP-3 532 is illustrated as having three links (e.g., a link-1 522, a link-2 524, and link-3 526).

According to certain non-limiting examples, an NID is tied to MBBR infra-MAC. That is, all APs that support the same NID also share the same MBBR MAC 502 implying seamless roaming.

According to certain non-limiting examples, the MBBR MAC 502 can be restricted to only APs on a particular floor where STAs need seamless roaming across physical APs. Alternatively or additionally, MBBR MAC 502 is that of an edge device (e.g. Meraki's Fresnel edge device) or a wireless LAN controller (WLC).

Figure 6:
FIG. 6 illustrates a flow diagram of an example of a method for establishing a multi-link security association, in accordance with certain embodiments.
Figure 6:
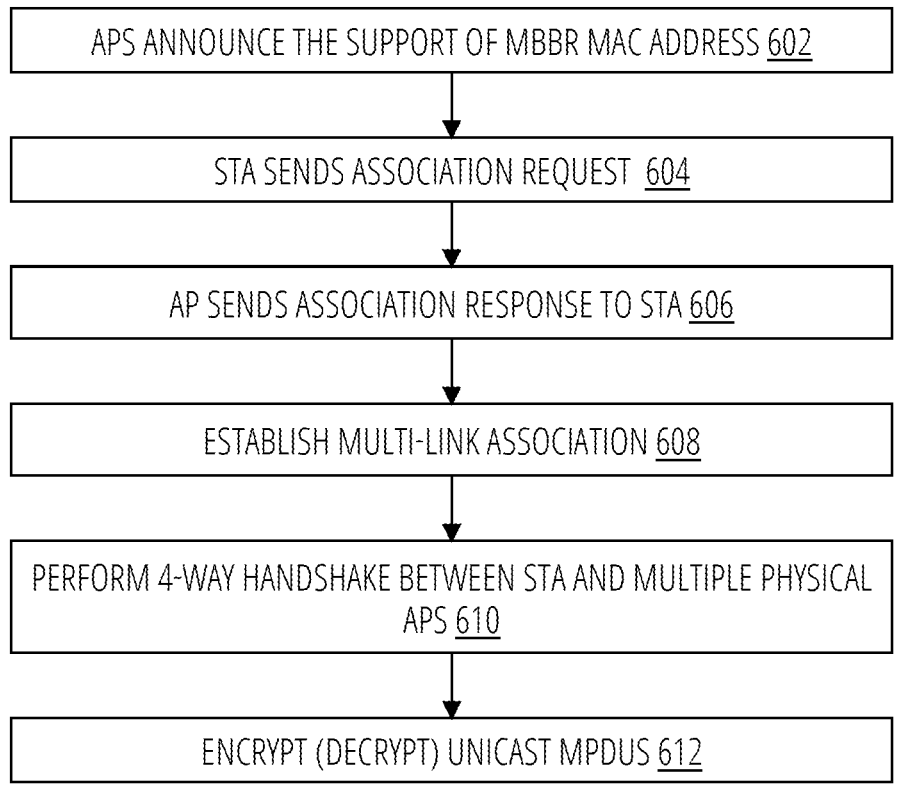

FIG. 6 illustrates an example method 600 for an improved security protocol to establish a pairwise transient key (PTK) for a link that include multiple physical APs. For example, it is desired to develop a new method of key generation that maintains each security association for the respective links when a link can include multiple physical APs. This improved method of key generation will benefit, among other things, the association timeframe while performing make-before-break-roaming (MBBR) across physical APs. Method 600 at least differs from the multi-link security protocol in Wi-Fi 7 by using the MBBR MAC address, rather than the AP MLD MAC address, to derive the pairwise transient key (PTK) for links that include multiple APs.

Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

According to some examples, in step 602 of method 600, the APs announce/signal that they support functionality of having an MBBR MAC 502. For example, the APs can announce/signal that they support this functionality as part of a vendor specific information element (VS IE). Further, this VS IE can be provided as part of a beacon or a probe response.

According to some examples, in step 604 of method 600, the STA sends association request. For example, the STA can send the association request to one of the APs of the multiple physical APs 536 (e.g., to physical AP-1 528). The association request can include a multi-link element specifying the MLD-MAC address of the STA, and the association request can include an indication that the STA needs MBBR MAC 502.

According to some examples, in step 606 of method 600, the AP (e.g., physical AP-1 528) sends association response to STA. For example, the association response to STA can include the infrastructure's MBBR MAC address instead of MLD-MAC of the AP (e.g., physical AP-1 528). Alternatively, MBBR MAC can also be exchanged to STA in association response using the VS IE.

For the STA associated with multiple physical APs, the supplicant is the non-AP MLD MAC address of the STA and the authenticator is the MBBR MAC 502 (which contrasts with Wi-Fi 7 in which the authenticator is the AP MLD MAC). For an AP MLD associated with another AP MLD, the supplicant is the STA and the authenticator is the MBBR MAC 502 (which again contrasts with Wi-Fi 7 in which the authenticator is the AP MLD MAC). That is, the pairwise master key security association (PMKSA) is established by the STA is between the infrastructure MLD that includes multiple physical APs and the non-AP MLD (i.e., the STA). Further, the authenticator MAC address is the MBBR MAC 502.

According to certain non-limiting examples, establishing the multi-link association can include generating a PMK using a finite cyclical group as described in the IEEE standard document "IEEE std. 802.11 2020," which incorporated herein by reference in its entirety, and more particularly in Section 12.4.4 "Finite cyclic groups" and in Section 12.4.4.3.3 "Direct generation of the password element with FFC groups."

For example, a first secret element (referred to as PT) is generated by the following process:
1. pwd-seed=HKDF-Extract (ssid, password [||identifier])
2. pwd-value=HKDF-Expand (pwd-seed, "SAE Hash to Element u1 P1", len)
3. u1=pwd-value modulo p
4. P1=SSWU(u1)
5. pwd-value=HKDF-Expand (pwd-seed, "SAE Hash to Element u2 P2", len) u2=pwd-value modulo p
6. P2=SSWU(u2)
7. PT=elem-op (P1, P2),
   where
   HKDF-Extract( ) and HKDF-Expand( ) are the functions defined in RFC 5869 instantiated with a hash algorithm based on prime length.
   ssid is an octet string that represents the SSID with which the password is to be used.
   olen( ) returns the length of its argument in octets.
   ceil( ) returns the smallest integer value that is not less than the passed parameter.
   [||identifier] indicates the optional inclusion of a password identifier, if present.
   SSWU(u) is a call to the Simple SWU routine passing in parameter u.
   HKDF-Extract( ) takes input key material (IKM) such as a shared secret generated using Diffie-Hellman, and an optional salt, and generates a cryptographic key called (e.g., pseudorandom key (PRK)). This acts as a randomness extractor, taking a potentially non-uniform value of high min-entropy and generating a value indistinguishable from a uniform random value.
   HKDF-Expand( ) takes the PRK, some additional information, and a length, and generates output of the desired length. HKDF-Expand acts as a pseudorandom function keyed on PRK. This means that multiple outputs can be generated from a single IKM value by using different values for the additional information field.
   The direct hashing technique used to derive an element of an ECC group is the Simplified Shallue-Woestijne-Ulas (SSWU) deterministic hash-to-curve method. The SSWU method is called twice with two distinct functions to produce two points on the elliptic curve. The two points are summed to create a secret element PT.

This method works for all Weierstrass elliptic curves whose constants a and b are both not equal to zero. Other curves shall not be used with this hash-to-curve method.

This hash-to-curve method uses HKDF (RFC 5869) with a hash algorithm based on the length of the prime of the ECC group to perform both functions. First HKDF-Extract is passed a salt in the form of the SSID for which the password is to be used, the password, and optionally a password identifier to produce and intermediary password seed. The resulting seed is passed to HKDF-Expand to produce two distinct strings using different labels. Both values are reduced modulo p, the prime defining the curve, and then passed to SSWU to produce distinct points, P1 and P2, whose sum is PT.

Once PT is obtained, the password element (PWE) can be calculated. For example, PWE can be calcualted using the following steps:
1. val=H(0n, MAX(STA-A-MAC, MBRR-MAC)||MIN (STA-A-MAC, MBRR-MAC))
2. val=val modulo (r−1)+1
3. PWE=scalar-op (val, PT)
   where STA-A-MAC and MBBR-MAC are the MAC addresses of the STA 534 and MBBR MAC 502, respectively, P is the passphrase known to both parties beforehand, and C is a counter that is incremented in each round. (novel). PMK is then generated using the PWE. For example, the PMK can be calculated using the method described in Section 12.4.5.4 of the IEEE standard document "IEEE std. 802.11 2020."

According to some examples, in step 610 of method 600, a PMK, which was established in the successful multi-link association realized in step 608, is used to derive a PTK by performing 4-way handshake between STA and multiple physical APs. For example, using the PMK and the MBBR MAC 502, the PTK can be derived for respective links, which can include multiple physical APs 536. The PTK can be derived using the 4-way handshake. Then the PMK, the PTK, and the same packet number (PN) space are used to setup all the links between the non-AP MLD (i.e., the STA) and the separate physical APs.

According to some examples, the PTK can be derived in accordance with the expression $$PTK = PRF - \text{Length } (PMK, \text{"Pairwise key expansion"}, Min(AA, SPA) \parallel$$
$$Max(AA, SPA) \parallel Min(ANonce, SNonce) \parallel Max(ANonce, SNonce)),$$

where AA (i.e., authenticator) is the MBBR infra-MAC address (i.e., MBBR MAC 502) and SPA (i.e., supplicant) is the non-AP MLD MAC address.

Figure 7:
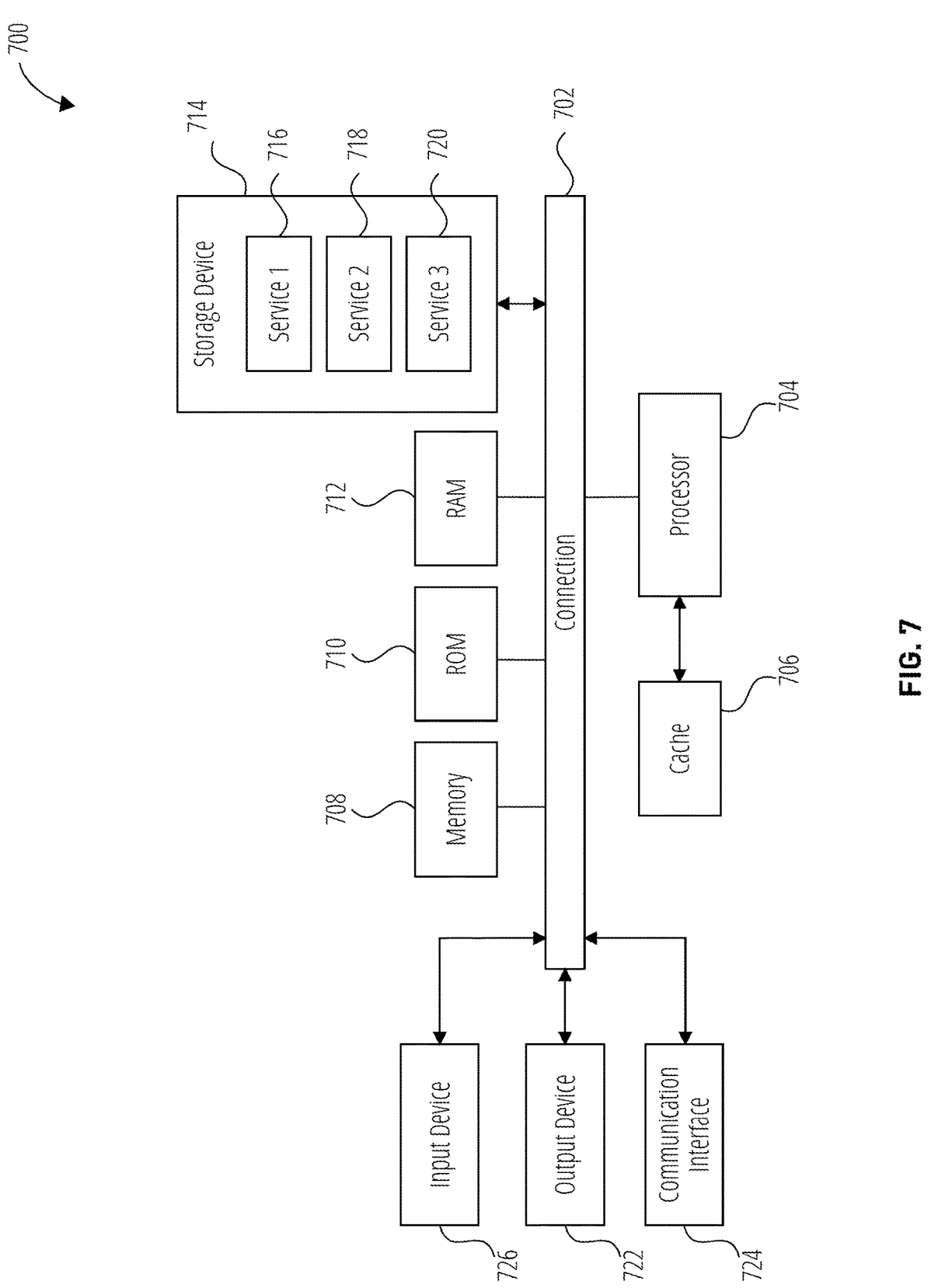
FIG. 7 shows a block diagram of an example of a computing device, in accordance with certain embodiments.

According to some examples, in step 612 of method 600, the pairwise transient key security association (PTKSA) is used for encrypting (decrypting) unicast media access control protocol data units (MPDUs) at step 612. For example, the same security association (PTKSA) is used to encrypt and decrypt the unicast media access control protocol data units (MPDUs) on any of the links across physical APs, FIG. 7 shows an example of computing system 700, which can be for example any computing device making up STA 534 or any of the APs (e.g., physical AP-1 528, physical AP-2 530, and physical AP-3 532), or any component thereof in which the components of the system are in communication with each other using connection 702. Connection 702 can be a physical connection via a bus, or a direct connection into processor 704, such as in a chipset architecture. Connection 702 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 700 includes at least one processing unit (CPU or processor) 704 and connection 702 that couples various system components including system memory 708, such as read-only memory (ROM) 710 and random access memory (RAM) 712 to processor 704. Computing system 700 can include a cache of high-speed memory 706 connected directly with, in close proximity to, or integrated as part of processor 704.

Processor 704 can include any general purpose processor and a hardware service or software service, such as services 716, 718, and 720 stored in storage device 714, configured to control processor 704 as well as a special-purpose processor where software instructions are incorporated into the actual processor design. Processor 704 may essentially be a completely self-contained computing system, containing multiple cores or processors, a bus, memory controller, cache, etc. A multi-core processor may be symmetric or asymmetric.

To enable user interaction, computing system 700 includes an input device 726, which can represent any number of input mechanisms, such as a microphone for speech, a touch-sensitive screen for gesture or graphical input, keyboard, mouse, motion input, speech, etc. Computing system 700 can also include output device 722, which can be one or more of a number of output mechanisms known to those of skill in the art. In some instances, multimodal systems can enable a user to provide multiple types of input/output to communicate with computing system 700. Computing system 700 can include communication interface 724, which can generally govern and manage the user input and system output. There is no restriction on operating on any particular hardware arrangement, and therefore the basic features here may easily be substituted for improved hardware or firmware arrangements as they are developed.

Storage device 714 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 714 can include software services, servers, services, etc., that when the code that defines such software is executed by the processor 704, it causes the system to perform a function. In some embodiments, a hardware service that performs a particular function can include the software component stored in a computer-readable medium in connection with the necessary hardware components, such as processor 704, connection 702, output device 722, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for generating a pairwise transient key security association (PTKSA) for a multi-link device (MLD) operating in a wireless network that supports multi-link operation (MLO) across multiple access points (APs) in a manner compatible with both Wi-Fi 7 and Wi-Fi 8 standards, the method comprising:

providing a first media access control (MAC) address that is shared by multiple access points (APs), the first MAC address corresponding to an infrastructure comprising the multiple APs, and each AP of the multiple APs having a respective AP MAC address;

providing a second MAC address to a station (STA) that is a non-AP MLD; and establishing a secure link between the STA and the infrastructure using the first MAC address and the second MAC address to derive a pairwise transit key (PTK) for the secure link, wherein the secure link is between the STA and one or more of the multiple APs thereby enabling seamless security association for the STA across the multiple APs in the multi-link operation compliant with both Wi-Fi 7 and Wi-Fi 8 standards.

2. The method of claim 1, wherein establishing the secure link between the STA and the infrastructure comprises:

deriving a pairwise master key (PMK) using a simultaneous authentication of equals (SAE) method to establish a multi-link association between the STA and the infrastructure; and using a 4-way handshake protocol between the STA and the infrastructure to derive the PTK based on the PMK, the first MAC address, and the second MAC address.

3. The method of claim 1, wherein the infrastructure is a make-before-break-roaming (MBBR) infrastructure.

4. The method of claim 3, further comprising setting up respective links between the STA and each AP of the one or more of the multiple APs using the PMK, the PTK, and a same packet number (PN) space.

5. The method of claim 3, further comprising providing roaming among respective APs of the infrastructure while maintaining secure communication between the STA and the infrastructure without the STA deriving a new PTK for the secure communication.

6. The method of claim 1, further comprising using the PTK for secure communications simultaneously between two or more APs of the multiple APs.

7. The method of claim 1, further comprising:

using the PTK to encrypt media access control protocol data units (MPDUs) transmitted from the STA to two or more APs of the multiple APs; or using the PTK to decrypt MPDUs received at the STA from two or more APs of the multiple APs.

8. A computing apparatus comprising:

a processor; and a memory storing instructions that, when executed by the processor, configure the apparatus to:

provide a first media access control (MAC) address that is shared by multiple access points (APs), the first MAC address corresponding to an infrastructure comprising the multiple APs, and each AP of the multiple APs having a respective AP MAC address;

provide a second MAC address to a station (STA) that is a non-AP MLD; and establish a secure link between the STA and the infrastructure using the first MAC address and the second MAC address to derive a pairwise transit key (PTK) for the secure link, wherein the secure link is between the STA and one or more of the multiple APs thereby enabling seamless security association for the STA across the multiple APs in the multi-link operation compliant with both Wi-Fi 7 and Wi-Fi 8 standards.

9. The computing apparatus of claim 8, wherein establishing the secure link between the STA and the infrastructure comprises:

deriving a pairwise master key (PMK) using a simultaneous authentication of equals (SAE) method to establish a multi-link association between the STA and the infrastructure; and using a 4-way handshake protocol between the STA and the infrastructure to derive the PTK based on the PMK, the first MAC address, and the second MAC address.

10. The computing apparatus of claim 8, wherein the infrastructure is a make-before-break-roaming (MBBR) infrastructure.

11. The computing apparatus of claim 10, when executed by the processor, the stored instructions further configure the apparatus to:

set up respective links between the STA and each AP of the one or more of the multiple APs using the PMK, the PTK, and a same packet number (PN) space.

12. The computing apparatus of claim 10, when executed by the processor, the stored instructions further configure the apparatus to:

provide roaming among respective APs of the infrastructure while maintaining secure communication between the STA and the infrastructure without the STA deriving a new PTK for the secure communication.

13. The computing apparatus of claim 8, when executed by the processor, the stored instructions further configure the apparatus to:

use the PTK for secure communications simultaneously between two or more APs of the multiple APs.

14. The computing apparatus of claim 8, when executed by the processor, the stored instructions further configure the apparatus to:

use the PTK to encrypt media access control protocol data units (MPDUs) transmitted from the STA to two or more APs of the multiple APs; or use the PTK to decrypt MPDUs received at the STA from two or more APs of the multiple APs.

15. A non-transitory computer-readable storage medium, the computer-readable storage medium including instructions that when executed by a computer, cause the computer to:

provide a first media access control (MAC) address that is shared by multiple access points (APs), the first MAC address corresponding to an infrastructure comprising the multiple APs, and each AP of the multiple APs having a respective AP MAC address;

provide a second MAC address to a station (STA) that is a non-AP MLD; and establish a secure link between the STA and the infrastructure using the first MAC address and the second MAC address to derive a pairwise transit key (PTK) for the secure link, wherein the secure link is between the STA and one or more of the multiple APs thereby enabling seamless security association for the STA across the multiple APs in the multi-link operation compliant with both Wi-Fi 7 and Wi-Fi 8 standards.

16. The non-transitory computer-readable storage medium of claim 15, wherein the infrastructure is a make-before-break-roaming (MBBR) infrastructure.

17. The non-transitory computer-readable storage medium of claim 16, wherein, when executed by a computer, the instructions further cause the computer to:

set up respective links between the STA and each AP of the one or more of the multiple APs using the PMK, the PTK, and a same packet number (PN) space.

18. The non-transitory computer-readable storage medium of claim 16, wherein, when executed by a computer, the instructions further cause the computer to:

provide roaming among respective APs of the infrastructure while maintaining secure communication between the STA and the infrastructure without the STA deriving a new PTK for the secure communication.

19. The non-transitory computer-readable storage medium of claim 15, wherein, when executed by a computer, the instructions further cause the computer to:

use the PTK for secure communications simultaneously between two or more APs of the multiple APs.

20. The non-transitory computer-readable storage medium of claim 15, wherein establishing the secure link between the STA and the infrastructure comprises:

deriving a pairwise master key (PMK) using a simultaneous authentication of equals (SAE) method to establish a multi-link association between the STA and the infrastructure; and using a 4-way handshake protocol between the STA and the infrastructure to derive the PTK based on the PMK, the first MAC address, and the second MAC address.

\*　\*　\*　\*　\*